(12) United States Patent
Hendriksen et al.

(10) Patent No.: US 12,482,879 B2
(45) Date of Patent: Nov. 25, 2025

(54) PHASE CHANGE MATERIAL FOR HEAT EXCHANGE FLUID/COOLANT

(71) Applicant: CASTROL LIMITED, Reading (GB)

(72) Inventors: Andre Antonius Maria Hendriksen, Moenchengladbach (DE); Hendrik Percy Peschel, Moenchengladbach (DE); Robert Paul Hudson, Reading (GB); Kevin Richard West, Reading (GB)

(73) Assignee: CASTROL LIMITED, Reading (GB)

( * ) Notice: Subject to any disclaimer, the term of this patent is extended or adjusted under 35 U.S.C. 154(b) by 1115 days.

(21) Appl. No.: 16/960,313

(22) PCT Filed: Jan. 7, 2019

(86) PCT No.: PCT/EP2019/050260
§ 371 (c)(1),
(2) Date: Jul. 6, 2020

(87) PCT Pub. No.: WO2019/135001
PCT Pub. Date: Jul. 11, 2019

(65) Prior Publication Data
US 2021/0057793 A1   Feb. 25, 2021

(30) Foreign Application Priority Data

Jan. 5, 2018   (EP) ..................... 18150501

(51) Int. Cl.
*H01M 10/6567*   (2014.01)
*C09K 5/06*   (2006.01)
*H01M 10/613*   (2014.01)

(52) U.S. Cl.
CPC ......... *H01M 10/6567* (2015.04); *C09K 5/063* (2013.01); *H01M 10/613* (2015.04)

(58) Field of Classification Search
CPC .. H01M 10/6567; H01M 10/613; C09K 5/063
See application file for complete search history.

(56) References Cited

U.S. PATENT DOCUMENTS

| | | |
|---|---|---|
| 5,424,519 A | 6/1995 | Salee |
| 5,814,595 A | 9/1998 | Flynn et al. |

(Continued)

FOREIGN PATENT DOCUMENTS

| | | |
|---|---|---|
| CN | 203856565 U | 10/2014 |
| CN | 105622959 A | 6/2016 |

(Continued)

OTHER PUBLICATIONS

Chen, Dafen, Jiuchun Jiang, Gi-Heon Kim, Chuanbo Yang, and Ahmad Pesaran. Applied Thermal Engineering 94 (2016): 846-854 (Year: 2016).*

(Continued)

*Primary Examiner* — Milton I Cano
*Assistant Examiner* — Albert Michael Hilton
(74) *Attorney, Agent, or Firm* — McDonnell Boehnen Hulbert & Berghoff LLP

(57) ABSTRACT

This disclosure relates generally to micellar emulsions. This disclosure relates more particularly to micellar emulsions useful as thermal management fluids, methods for preparing such emulsions, and methods of using such emulsions.

17 Claims, 3 Drawing Sheets

(56) References Cited

U.S. PATENT DOCUMENTS

| | | | |
|---|---|---|---|
| 6,468,689 | B1 | 10/2002 | Hallaj et al. |
| 6,515,031 | B2 * | 2/2003 | Fefer .................... A01N 25/30 |
| | | | 71/64.08 |
| 9,541,135 | B2 | 1/2017 | Tsuna |
| 10,128,550 | B2 | 11/2018 | Lebreux et al. |
| 10,217,979 | B2 | 2/2019 | Harris et al. |
| 2002/0177035 | A1* | 11/2002 | Oweis ............... H01M 10/6567 |
| | | | 429/120 |
| 2004/0046147 | A1* | 3/2004 | Matsuda ................ F28D 20/02 |
| | | | 252/70 |
| 2004/0110050 | A1 | 6/2004 | Elhamid et al. |
| 2005/0061497 | A1 | 3/2005 | Amaral et al. |
| 2005/0167169 | A1 | 8/2005 | Gering et al. |
| 2008/0011979 | A1 | 1/2008 | Davidson et al. |
| 2008/0272331 | A1 | 11/2008 | Mohapatra |
| 2009/0176148 | A1 | 7/2009 | Jiang et al. |
| 2009/0242829 | A1 | 10/2009 | Davidson et al. |
| 2010/0071881 | A1 | 3/2010 | Murer et al. |
| 2010/0108936 | A1 | 5/2010 | Kaneko |
| 2011/0073282 | A1 | 3/2011 | Guelles et al. |
| 2011/0088418 | A1 | 4/2011 | Kontomaris et al. |
| 2011/0262793 | A1* | 10/2011 | Reis .................... H01M 10/635 |
| | | | 429/120 |
| 2012/0263980 | A1 | 10/2012 | Soukhojak et al. |
| 2013/0037741 | A1 | 2/2013 | Birnbaum et al. |
| 2013/0104548 | A1 | 5/2013 | Kontomaris |
| 2013/0201785 | A1 | 8/2013 | Dahms et al. |
| 2013/0209838 | A1 | 8/2013 | Manna et al. |
| 2013/0256586 | A1 | 10/2013 | Kramer et al. |
| 2014/0079978 | A1 | 3/2014 | Al-Hallaj et al. |
| 2014/0216688 | A1 | 8/2014 | Shelnutt et al. |
| 2016/0163412 | A1 | 6/2016 | Walker |
| 2016/0325598 | A1 | 11/2016 | Schumann et al. |
| 2016/0333241 | A1 | 11/2016 | Fukushima et al. |
| 2018/0363989 | A1* | 12/2018 | Elie ......................... C09K 5/00 |
| 2021/0362580 | A1* | 11/2021 | Pearson .................... B60K 1/04 |

FOREIGN PATENT DOCUMENTS

| | | | |
|---|---|---|---|
| CN | 106785222 | A | 5/2017 |
| EP | 3367495 | A1 | 8/2018 |
| JP | H02246255 | A | 10/1990 |
| JP | 2000336350 | A * | 12/2000 |
| JP | 2002053850 | A | 2/2002 |
| JP | 2003-533844 | A | 11/2003 |
| JP | 2006083276 | A | 3/2006 |
| JP | 2008-115266 | A | 5/2008 |
| JP | 2010132792 | A | 6/2010 |
| JP | 2012184360 | A | 9/2012 |
| JP | 2015-021117 | A | 2/2015 |
| JP | 2016188349 | A | 11/2016 |
| JP | 2018126017 | A | 8/2018 |
| WO | 2001065626 | A2 | 9/2001 |
| WO | 2005007771 | A1 | 1/2005 |
| WO | 2013077379 | A1 | 5/2013 |
| WO | 2016/150925 | A1 | 9/2016 |
| WO | 2018007611 | A1 | 1/2018 |

OTHER PUBLICATIONS

Sharma, A., Tyagi, V. V., Chen, C. R., & Buddhi, D. (2009). Renewable and Sustainable energy reviews, 13(2), 318-345 (Year: 2009).*
Huang, L., Petermann, M., & Doetsch, C. (2009). Evaluation of paraffin/water emulsion as a phase change slurry for cooling applications. Energy, 34(9), 1145-1155. (Year: 2009).*
Wang, X., Zhang, L., Yu, Y. H., Jia, L., Sam Mannan, M., Chen, Y., & Cheng, Z. (2015). Nano-encapsulated PCM via pickering emulsification. Scientific reports, 5(1), 13357. (Year: 2015).*
Machine translation of JP2000336350A (Year: 2024).*
Cameo Chemicals, Paraffin Wax Chemical Datasheet, accessed 2024 (Year: 2024).*
Sigma-Aldrich Polyoxyethylene 20 Cetyl Ether (Year: 2003).*
Manikandan, S., and K. S. Rajan. "New hybrid nanofluid containing encapsulated paraffin wax and sand nanoparticles in propylene glycol-water mixture: Potential heat transfer fluid for energy management." Energy Conversion and Management 137 (2017): 74-85. (Year: 2017).*
International Search Report and Written Opinion of the International Searching Authority for International Application No. PCT/EP2019/050260, mailed on Feb. 28, 2019.
European Search Report and Opinion for European Application No. 18150501, mailed on May 18, 2018.
Zhoujian et al. "A review on lithium-ion power battery thermal management technologies and thermal safety", Journal of Thermal Science, 2017, 26(5), p. 391-412.
James-Smith et al. "A novel method to quantify the amount of surfactant at the oil/water interface and to determine total interfacial area of emulsions." Journal of Colloid and Interface Science, 2007, 310(2), p. 590-598.
3M Thermal Management Fluids, Apr. 2009.
3M™ Two-Phase Immersion Cooling—High Level Best Practices for System Fabrication, Technical Paper, Nov. 2014.
Zeozorb Series Transformer Breather for Power Transformers, ZZ-T-1320 Brochure, Nov. 2014.
Hilco™ Filter Cartriges, p. 6, Nov. 2012.
Shah, Rhutesh K. et al. "Designer emulsions using microfluidics." Materials Today, 11(4), pp. 18-27, (Apr. 2008).

* cited by examiner

PHASE CHANGE MATERIAL FOR HEAT EXCHANGE FLUID/COOLANT

This application is a national stage application under 35 U.S.C. § 371 of International Application No. PCT/EP2019/050260, filed Jan. 7, 2019, which claims priority to European Application No. 18150501.7, filed Jan. 5, 2018, the disclosures of which are explicitly incorporated by reference herein.

BACKGROUND OF THE DISCLOSURE

Field of the Disclosure

This disclosure relates generally to micellar emulsions. This disclosure relates more particularly to micellar emulsions useful as thermal management fluids, methods for preparing such emulsions, and methods of using such emulsions.

Technical Background

It is estimated that by 2035, over 120 million electric vehicles (i.e., vehicles using electric power for all or a portion of their motive power such as battery electric vehicles (BEVs), hybrid electric vehicles (HEVs), plug-in hybrid electric vehicles (PHEVs), and the like) will be on the roads. Ultimately, the vast majority of the vehicles will likely be electric. As electric vehicle technology continues to evolve, there is a need to provide improved power sources (e.g., battery systems or modules). For example, it is desirable to increase the distance that such vehicles may travel without the need to recharge the batteries, to improve the performance of such batteries, and to reduce the costs and time associated with the battery charging.

Currently, there is a trend towards battery electric vehicles almost exclusively using lithium ion battery technology. Lithium ion batteries offer many advantages over the comparable nickel-metal-hydride batteries, but unlike the nickel-metal-hydride batteries, lithium ion batteries are more susceptible to variations in battery temperature and require very stringent thermal management requirements. For example, the operating temperatures below 10° C. are inefficient, while the optimal battery operating temperatures are in the range of 10 and 35° C. Operation of the battery is increasingly inefficient as temperatures rise from 35 to 70° C., and operation at these temperatures damages the battery over time. Temperatures over 70° C. present significant risk of thermal runaway. As a result, lithium ion batteries require systems to regulate their temperatures during vehicle operation. In addition, during charging, up to 10% of the inputted power ends up as heat. As the fast charging of lithium ion batteries becomes more common, the need remains for the efficient systems for thermal management of the batteries.

Dispersions of solid paraffin wax in aqueous solution have been used as phase change material (PCM) slurries or liquid coolants. These slurries and liquid coolants have been proposed for use as thermal management fluids in batteries (e.g., lithium ion batteries). The solid paraffin wax dispersions increase the heat capacity of the thermal management fluid over the temperature range in which the paraffin melts due to the high melting enthalpy of melting. This latent heat effect, allows the thermal management fluid to remove heat energy from a hot surface without substantially increasing the temperature of the fluid (i.e. act as a more efficient coolant.)

SUMMARY OF THE DISCLOSURE

Although phase change material coolants are promising, there are two key drawbacks that may prevent their use in coolant systems. First, coalescence of molten paraffin presents a major drawback for its use as phase change material coolant. Specifically, the coalescence of molten paraffin results in deposition of solid paraffin in the cooling system and eventual blockage of the cooling system. Next, the dispersed paraffin particles increase the viscosity of the fluid. In general, the viscosity of the phase change material coolant is increased with increasing paraffin content and increasing paraffin particle size. This is detrimental to the thermal conductivity of the fluid as heat is able to diffuse more quickly through low viscosity fluids. Phase change material coolants are therefore a trade-off between two critical properties of a coolant fluid—heat capacity and thermal conductivity. Thus, it would be advantageous to provide the thermal management fluid that can overcome these drawbacks.

The present inventors have found simple and cost-efficient emulsions that have improved dispersion of the phase change material. The improved dispersion, in turn, reduces the tendency of dispersed phase change material (e.g., paraffin) to coalesce when molten. In addition, the phase change material is formulated into micelles having a very small diameter and a very narrow size distribution that, in turn, allows for the emulsion of the disclosure to have improved viscosity and, as a result, thermal diffusivity. The smaller micelle size also allows for a higher concentration of the phase change material in the emulsion and thus improving the heat capacity of the emulsion. The higher number of micelles with small diameter and narrow size distribution results in an increased surface area of the micelles compared, which in turn allows for faster temperature response of the emulsion and improved thermal conductivity. The phase change material absorbs heat through the effect of latent heat of fusion over a desired temperature range.

Thus, one aspect of the disclosure provides an emulsion comprising:
 an aqueous carrier fluid; and
 a dispersion of micelles within the aqueous carrier fluid, wherein each micelle comprises a solid hydrophobic core particle comprising a phase change material and one or more emulsifiers forming a micellar shell around the solid hydrophobic core particle, wherein the micelles have a mean particle size diameter in the range of about 0.1 µm to about 1.5 µm (e.g., preferably in the range of about 0.25 µm to about 1.0 µm).

The emulsions of the disclosure can be provided in a variety of concentrations. For example, in certain embodiments, an emulsion of the disclosure is provided at a concentration suitable for use as a thermal management fluid concentrate, i.e., at a concentration that can be diluted with aqueous media to provide a thermal management fluid. In other embodiments, an emulsion of the disclosure is provided at a concentration that is itself suitable for use as a thermal management fluid (e.g., a fully formulated thermal management fluid).

Another aspect of the disclosure provides a method for preparing an emulsion, including combining a first fluid comprising one or more emulsifiers dissolved in an aqueous carrier fluid and a second fluid comprising one or more phase change materials; and contacting the first fluid with the second fluids under a shear force to produce an intermediate fluid; and recovering the emulsion from the intermediate fluid.

Another aspect of the disclosure provides a method comprising
  passing an emulsion or a thermal management fluid of the disclosure over a surface; and
  absorbing thermal energy in the thermal management fluid from the surface.

In another aspect the disclosure provides a battery pack comprising:
  a housing;
  one or more electrochemical cells disposed in the housing;
  a fluid path extending through the housing and in substantial thermal communication with the one or more electrochemical cells; and
  an emulsion or a thermal management fluid of the disclosure.

In another aspect the disclosure provides a thermal management circuit comprising:
  a fluid path extending around and/or through an electrical component;
  a heat exchanger;
  a pump;
  at least one conduit connecting the fluid path, the heat exchanger, and the pump; and
  an emulsion or a thermal management fluid of the disclosure,
  wherein the thermal management fluid is disposed in the fluid path, the heat exchanger, the pump and the conduits.

BRIEF DESCRIPTION OF THE DRAWINGS

The accompanying drawings are included to provide a further understanding of the compositions and methods of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
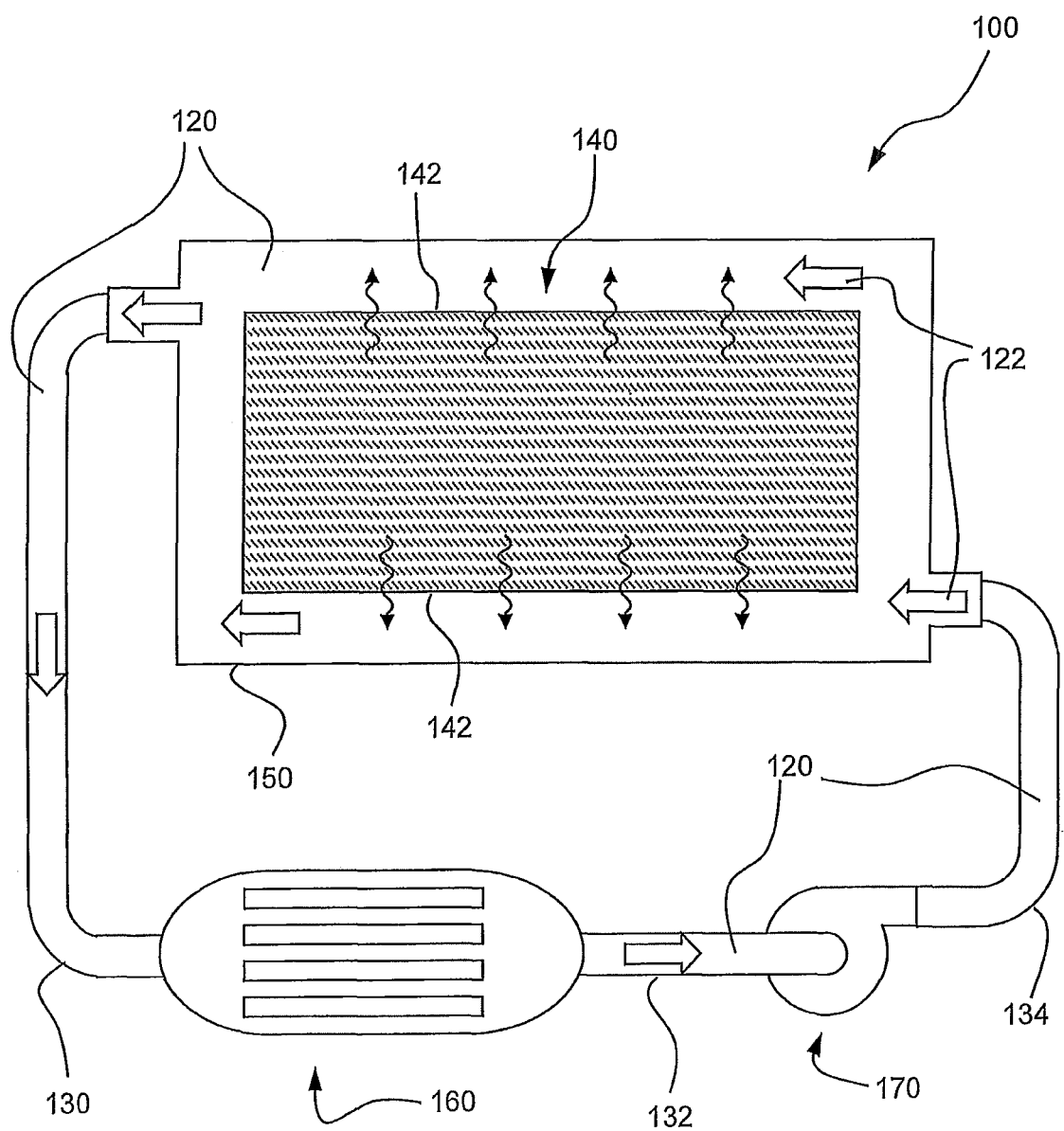
FIG. 1 is a schematic cross-sectional view of a thermal management circuit according to an embodiment of the disclosure.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following embodiments and claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

All percentages, ratios and proportions herein are by weight, unless otherwise specified.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

In general, the disclosed materials and methods, and apparatus provide improvements in emulsions (for example, suitable for use as thermal management fluid) that reduce the tendency of dispersed phase change material (e.g., paraffin) to coalesce when molten. In addition, the phase change material is formulated into micelles having a very small diameter and a very narrow size distribution that, in turn, allows for the emulsion of the disclosure to have improved viscosity and, as a result, thermal conductivity. The smaller micelle size also allows for a higher concentration of the phase change material in the emulsion and thus improving the heat capacity of the emulsion. The higher number of micelles with small diameter and narrow size distribution results in an increased surface area of the micelles, which in turn allows for faster temperature response of the emulsion and improved thermal conductivity. The phase change material absorbs heat via the effect of latent heat of fusion over a desired temperature range, such that the material present as a solid phase melts at a specific temperature, thus absorbing heat and entering the liquid phase. Once the emulsion cools below the melting point, phase change material in the liquid phase solidifies into a solid phase ready for use during subsequent heating cycles of the emulsion. It is also possible to provide an emulsion comprising a variety of phase change materials, each with a different melting point and/or mass, such that the solid phase change materials enter the liquid phase over a range of temperatures. This results in the emulsion being able to provide a constant or varying cooling effect as desired. For example, a wax with a lower melting point may be suitable for general use, a wax with a moderate melting point may be suitable for charging a battery, and a wax with a higher melting point used to prevent thermal runaway in a battery. It may also be desirable to be able to pass the emulsion through a heat exchanger to provide a cooling effect by dumping heat away from a battery, for example.

Thus, one aspect of the disclosure provides an emulsion comprising:
  an aqueous carrier fluid; and
  a dispersion of micelles within the aqueous carrier fluid, wherein each micelle comprises a solid hydrophobic core particle comprising a phase change material and one or more emulsifiers forming a micellar shell around the solid hydrophobic core particle, wherein the micelles have a mean particle size diameter in the range of about 0.1 µm to about 1.5 µm.

As the person of ordinary skill in the art will appreciate, a micelle is an aggregate of emulsifier molecules dispersed in a colloid, where particles of a first material are suspended in a second material, creating a two-phase system. Unlike in a solution, the first material is insoluble or immiscible in the second material (i.e., it becomes an emulsion). In an aqueous solution, a micelle forms an aggregate with the hydrophobic tails of the emulsifier molecules facing inwards and the hydrophilic heads of the emulsifier molecules facing outwards. This forms a normal-phase micelle, leading to an oil-in-water phase mixture. An inverse-phase micelle has the inverse structure, where the hydrophilic heads of the emulsifier molecules face inwards and the hydrophobic tails face outwards. This leads to a water-in-oil phase mixture. The packing behavior of the emulsifier molecules may lead to a single layer of emulsifier molecules around the core of the micelle, which, following surface energy considerations, may typically form a sphere. Thus, in certain embodiments, the micelles of the disclosure are generally spherical in structure. In the present embodiments an oil-in-water system is envisaged, since the phase change material is a solid oily (waxy) material.

Further layers of emulsifier may also be packed around the outside of the micelle. This will be the case when further emulsifier is added to the mixture. For example, when shear forces are applied to the phase change material, the molecules of the phase change material stretch. This stretching causes the molecules to flatten out and form a laminar structure, thus increasing the surface area any emulsifier has available to be attracted to. Coupled with a laminar flow around the molecule of a dispersion of emulsifier in water, the packing fraction of the emulsifier increases from ≤⅓ to >½. Once the shear force is removed from the molecule, it forms a spherical micelle due to surface energy considerations, unless, of course, the structure of the emulsifier causes the minimum surface energy configuration of a micelle to be laminar or cylindrical. For example, Gemini emulsifiers, sometimes known as dimeric emulsifiers, have two hydrophobic tails that distort the core of the micelle into an elongated ovoid shape. The emulsifier packing fraction then reduces back to ≤⅓ for spherical micelles, so any emulsifier that had been attracted to the temporary laminar configuration of the molecule forms additional layers of emulsifier around the micelle. Only odd numbers of layers form, however, because for a normal-phase micelle the even layers of emulsifier molecules are arranged with the hydrophilic heads in contact with the hydrophilic heads of the first layer of emulsifier molecules, and the hydrophobic tails pointing outwards. The inverse is true for an inverse-phase micelle. Therefore, in both cases, a micelle will have 1, 3, 5, 7 . . . n=2k+1 layers of emulsifier. This also results in effectively no free emulsifier in any form within the emulsion as emulsifier will be bound within these micelles, in multiple layers. As noted above, there is substantially no unbound emulsifier present in the aqueous solution. The more emulsifier added into the emulsion—the greater the number of layers of emulsifier in the micelle. Thus, in certain embodiment, the emulsifier molecules are disposed around a hydrophobic core in a single molecular layer. In certain other embodiments, the emulsifier molecules are disposed around a hydrophobic core in three or more molecular layers. In certain embodiments, different molecular layers may comprise two or more emulsifiers. For example, a non-ionic emulsifier may be present within the surface layers, and ionic emulsifiers may be present within the layer.

One advantage of the fluids and methods of the disclosure is uniform size of the micelles in the emulsion. The distribution of the average diameters of the micelles follows a Gaussian profile. The average micelle diameter is an average of various diameter measurements taken for a micelle, which in the case of spherical micelles is approximately equal to the micelle diameter (since there is little or no variation of the diameter regardless of where the measurement is taken).

As described above, the inventors have noted that use of a micellar emulsion with a relatively narrow micellar particle size distribution can result in a number of advantages. As the person of ordinary skill in the art will appreciate, the micellar size distribution can be characterized by d50, d10 and d90 values, where d50 is the median particle size, d10 is the particle size at the $10^{th}$ percentile of particles ranked by size, and d90 is the particle size at the $90^{th}$ percentile of particles ranked by size. In certain embodiments, the micelles of a particular emulsion as otherwise described herein have a d50 value in the range of 0.1 μm to 1.5 μm; e.g., 0.1 μm to 1.2 μm, or 0.1 μm to 1.0 μm, or 0.1 μm to 0.5 μm, or 0.1 μm to 0.4 μm, or 0.2 μm to 1 μm, or 0.2 μm to 0.8 μm, or 0.2 μm to 0.6 μm, or 0.2 μm to 0.5 μm, or 0.2 μm to 0.4 μm, or 0.4 μm to 1 μm, or 0.4 μm to 0.8 μm, or 0.4 μm to 0.6 μm, or 0.4 μm to 0.5 μm, or 0.3 μm to 0.5 μm, or 0.35 μm to 0.45 μm. In certain embodiments, d10 is no less than 50% of d50 and d90 is no more than 150% of d50. In certain embodiments, d10 is no less than 60% of d50 and d90 is no more than 140% of d50. In certain embodiments, d10 is no less than 70% of d50 and d90 is no more than 130% of d50. In certain embodiments, d10 is no less than 75% of d50 and d90 is no more than 125% of d50. In certain embodiments, d10 is no less than 80% of d50 and d90 is no more than 120% of d50.

In certain embodiments, the micelles have a mean diameter of no more than 1.5 μm; e.g., a mean diameter in the range of 0.1 μm to 1.5 μm; e.g., 0.1 μm to 1.2 μm, or 0.1 μm to 1.0 μm, or 0.1 μm to 0.5 μm, or 0.1 μm to 0.4 μm, or 0.2 μm to 1 μm, or 0.2 μm to 0.8 μm, or 0.2 μm to 0.6 μm, or 0.2 μm to 0.5 μm, or 0.2 μm to 0.4 μm, or 0.4 μm to 1 μm, or 0.4 μm to 0.8 μm, or 0.4 μm to 0.6 μm, or 0.4 μm to 0.5 μm, or 0.3 μm to 0.5 μm, or 0.35 μm to 0.45 μm. In certain embodiments, a particularly preferred mean diameter is in the range of 0.1 μm to 1.0 μm.

While there are a number of suitable measurement techniques to determine both the micellar particle size and the micellar particle size distribution, for quantification for purposes of this disclosure, laser particle size analysis using a Beckman Coulter Laser Diffraction PS Analyzer (LS 13 320) is used. This method employs Fraunhoffer diffraction and Polarization Intensity Differential Scanning (PIDS) to determine particle size.

As described above, the micelles of the disclosure comprise a phase change material. As used herein, a phase change material is materials with a high heat of fusion (e.g., more than 100 kJ/kg, or more than 150 kJ/kg, or even more than 200 kJ/kg) that, when melting and solidifying at certain temperatures, are capable of storing and releasing energy. Various phase change materials known in the art can suitably be used in the practice of the invention. Desirably, the phase change materials suitable for use the micelles of the disclosure will be thermally cyclable, non-hazardous or non-toxic, and non-reactive or otherwise inert with respect to other battery components. In certain embodiments, the phase change material is a waxy, wax-based, or wax-containing material.

The choice of suitable phase change material will depend upon the end application of the fluid of the disclosure. The phase change material may be a fully formulated waxy material or may be a blend of components, wherein at least one component is waxy. In certain embodiments, the phase change materials may be selected from paraffins, microcrystalline waxes, polyethylene waxes, ester waxes, fatty acids, fatty amide-containing materials, sulfonamide materials, resinous materials made from different natural sources (for example, tall oil rosins and rosin esters), synthetic resins, oligomers, polymers and copolymers, and combinations thereof.

In certain embodiments, the phase change material is paraffin. Paraffin wax consists of a mixture of mostly straight chain alkanes having in the range of 14 and 40 carbon atoms. Commercially available paraffin wax may be fully refined grade (i.e., containing less than 0.5% oil), semi refined grade (i.e., containing in the range of 0.5 and 1.5% oil), scale waxes grade (i.e., containing in the range of 0.5% to 5% oil), and slack wax grade (i.e., containing in the range of 5% to 20% oil). One of skill in the art will recognize that choice of suitable paraffin with respect to the size and grade will depend on the desired properties of the emulsion. Some commercial sources include, for example, PARAFOL and SASOLWAX brands of paraffin wax (available from Sasol, Germany), Indrawax brand of paraffin wax (available from Industrial Raw Materials LLC, Plainview, New York), paraffin waxes available from BASF, Germany), and Parvan™ brand of paraffin wax (available from Exxon Mobil Corporation, Irving, Texas).

In certain embodiments, the phase change materials may be selected from 1-cyclohexylooctadecane, 4-heptadacanone, quinone, benzamide, and a mixture thereof. In certain embodiments, the phase change materials may be paraffin in combination with one or more of 1-cyclohexylooctadecane, 4-heptadacanone, quinone, and benzamide.

The choice of the phase change material may also depend on the operating temperatures of the thermal management applications and devices. Thus, in certain embodiments, the phase-change material has a melting point of at least 30° C.; e.g., at least 35° C., or at least 40° C., or at least 50° C., or at least 60° C., or at least 70° C., or in the range of 30° C. and 100° C., or in the range of 30° C. to 90° C., or in the range of 30° C. to 80° C., or in the range of 30° C. to 75° C., or in the range of 30° C. to 70° C., or in the range of 30° C. to 65° C., or in the range of 30° C. to 60° C., or in the range of 35° C. to 100° C., or in the range of 35° C. to 90° C., or in the range of 35° C. to 80° C., or in the range of 35° C. to 75° C., or in the range of 35° C. to 70° C., or in the range of 35° C. to 65° C., or in the range of 35° C. to 60° C., or in the range of 40° C. to 100° C., or in the range of 40° C. to 90° C., or in the range of 40° C. to 80° C., or in the range of 40° C. to 75° C., or in the range of 40° C. to 70° C., or in the range of 40° C. to 65° C., or in the range of 40° C. to 60° C., or in the range of 50° C. to 100° C., or in the range of 50° C. to 90° C., or in the range of 50° C. to 80° C., or in the range of 50° C. to 75° C., or in the range of 50° C. to 70° C., or in the range of 50° C. to 65° C., or in the range of 50° C. to 60° C.

Notably, the present inventors have determined that, while high-viscosity or solid phase additives such as waxes (e.g., paraffins) are generally difficult to emulsify, they can be successfully and stably emulsified using the methods described herein. In certain embodiments, the emulsion may have an overall viscosity value at 30° C. (in accordance with ASTM D455) of around 3.4 cP, mimicking a 60/40 water/ethylene glycol coolant.

The emulsions of the disclosure may comprise one phase-change material (i.e., the micelles of the disclosure comprise one phase-change material). The emulsions of the disclosure may also comprise two or more different phase changing materials. For example, in certain embodiments, the micelles comprise a first set of micelles having solid hydrophobic core particles comprising a first phase change material, and a second set of micelles having solid hydrophobic core particles comprising a second phase change material different from the first phase change material. The first phase change material and the second phase change material may have substantially the same melting point (e.g., no more than 5° C. difference in melting points, or no more than 2° C. difference in melting points, or no more than 1° C. difference in melting points). The first phase change material and the second phase change material may also have different melting points (e.g., at least 10° C. difference in melting points, or at least 20° C. difference in melting points, or at least 50° C. difference in melting points).

In certain embodiments of the disclosure, the emulsions include the phase change materials in an amount within the range of about 10 wt % to about 60 wt %, based on the total weight of the emulsion. For example, in certain embodiments of the emulsion as otherwise described herein, the phase transfer material is present in an amount of about 10 wt % to about 50 wt %, or about 10 wt % to about 30 wt %, or about 10 wt % to about 15 wt %, or about 40 wt % to about 60 wt %, or about 45 wt % to about 55 wt %, or about 50 wt % to about 60 wt %, or about 50 wt % to about 55 wt %. A particularly preferred embodiment employs a wax content of about 53.9 wt %.

As described above, the emulsions of the disclosure include one or more emulsifiers. The inventors have found that, in certain embodiments, the one or more emulsifiers is substantially bound into the micelle. For example, in certain embodiments, no more than 1 wt % of the one or more emulsifiers is present in the emulsion in an unbound state (i.e., not part of a micelle), based on the total weight of the emulsion. In certain embodiments, no more than 0.5 wt %, or no more than 0.1 wt %, or no more than 0.05 wt %, or even no more than 0.01 wt % is present in the emulsion in an unbound state, based on the total weight of the emulsion. The point at which the emulsion becomes substantially free of excess emulsifier can be determined by measuring the surface tension of the emulsion. Once the critical micelle concentration has been reached, and no more emulsifier molecules are included in the surface layer(s), the surface tension of the emulsion exhibits a discontinuity. This may be detected by surface tension measurement techniques known to those skilled in the art. Other techniques for determining this point include nuclear magnetic resonance (NMR) techniques and optical scattering techniques. These include those taught in James-Smith et al, *Journal of Colloid and Interface Science,* 310:590-598 (2007).

In certain desirable embodiments as otherwise described herein, the emulsion is substantially free of defoamers and anti-foam compounds. The present inventors have determined that the emulsification techniques described herein can provide emulsions that are not susceptible to foaming, despite not including substantial amounts of defoamers/anti-foam compounds. For example, in certain embodiments, the emulsion of the disclosure comprises no more than 2 wt % of the one or more one or more defoamers and anti-foam compounds based on the total weight of the emulsion, e.g., no more than 1 wt %, or no more than 0.5 wt %, or no more than 0.1 wt %, or no more than 0.01 wt %, or no more than 0.005 wt %, or even no more than 0.001 wt %.

Typical anti-foam/defoamer compositions used commonly used in metalworking fluids include organo-modified siloxane antifoams, PDMS (polydimethylsiloxane) antifoams, and wax defoamers. Both organo-modified siloxane antifoams and PDMS antifoams are based on a poly-siloxane backbone. In a PDMS antifoam, only methyl groups and oxygen are bonded at the silicon atom. In organo-modified siloxane antifoams, organic side chains (such as copolymers of ethylene-/propylene-oxide are chemically bonded to the polysiloxane backbone. Typical wax defoamers include, but are not limited to, ethylene bis stearamide (EBS), paraffin waxes, ester waxes, and fatty alcohol wax. With each type of anti-foam/defoamer the foam is destroyed by the hydrophobic solid material in the anti-foam/defoamer breaking down the film that forms between the anti-foam/defoamer material and the droplets of foam. In certain embodiments as otherwise described herein, the emulsion of the disclosure comprises no more than 1 wt % total of organo-modified siloxane antifoams, PDMS (polydimethylsiloxane) antifoams, and wax defoamers, or no more than 2 wt % of the one or more one or more defoamers and anti-foam compounds based on the total weight of the emulsion, e.g., no more than 1 wt %, or no more than 0.5 wt %, or no more than 0.1 wt %, or no more than 0.01 wt %, or no more than 0.005 wt %, or even no more than 0.001 wt %.

Emulsifiers suitable for use in the embodiments of the disclosure include all those that are oil soluble with polar head molecules, including those having the general structure hydrocarbyl group-aryl group-polyether group. A particularly useful wax emulsifier is one comprising a mixture of alkyl and alkylaryl ethoxylates, such as an alkyl phenol ethoxylate. In certain embodiments, the emulsifiers may include surfactants. The person of ordinary skill in the art will select desirable emulsifiers based on the disclosure herein.

In certain embodiments of the disclosure, the emulsions of the disclosure include one or more emulsifiers in an amount within the range of about 0.1 wt % to about 10 wt % based on the total weight of the emulsion. For example, in certain embodiments of the emulsion as otherwise described herein, the one or more emulsifiers is present in an amount of about 0.1 wt % to about 8 wt %, or about 0.1 wt % to about 5 wt %, or about 0.1 wt % to about 2 wt %, or about 0.1 wt % to about 1 wt %, or about 0.2 wt % to about 10 wt %, or about 0.2 wt % to about 8 wt %, or about 0.2 wt % to about 5 wt %, or about 0.2 wt % to about 2 wt %, or about 0.2 wt % to about 1 wt %, or about 0.5 wt % to about 10 wt %, or about 0.5 wt % to about 8 wt %, or about 0.5 wt % to about 5 wt %, or about 0.5 wt % to about 2 wt %, or about 1 wt % to about 10 wt %, or about 1 wt % to about 8 wt %, or about 1 wt % to about 5 wt %, or about 2 wt % to about 10 wt %, or about 2 wt % to about 8 wt %, or about 2 wt % to about 5 wt %, based on the total weight of the emulsion. As the person of ordinary skill in the art will appreciate, the amount of the one or more emulsifiers is directly scalable with the weight % of the phase-change material.

As the person of ordinary skill in the art will appreciate, the ratio of the amount of phase change material to the amount of emulsifier will be a factor that determines the micelle size. In certain embodiments as otherwise described herein, the weight ratio of the amount of phase change material to the amount of emulsifier is in the range of about 1 to about 10, or about 1 to 8, or about 2 to 10.

An aqueous carrier fluid in certain embodiments of the disclosure may be water. In certain embodiments, the aqueous carrier fluid may be water and one or more of glycerol, methanol, ethylene glycol, propylene glycol, and diethylene glycol, In certain embodiments, the one or more of glycerol, methanol, ethylene glycol, propylene glycol, and diethylene glycol may be present in an amount of about 1 to 10 wt % based on the total weight of the aqueous carrier fluid.

As the person of ordinary skill in the art will appreciate based on the disclosure, the emulsions of the disclosure can also include a variety of other components, such as those conventional in compositions for thermal management applications. Examples include, but are not limited to corrosion inhibitors, preservatives, biocides, and combinations thereof.

In certain embodiments, the emulsion may further comprise one or more of corrosion inhibitors, preservatives, biocides, and combinations thereof, for example, present in an amount up to 5.0 wt %, based on the total weight of the emulsion. In certain such embodiments, one or more of corrosion inhibitors, preservatives, biocides, and combinations thereof are present in an amount in the range of about 0.1 wt % to about 5.0 wt %, or about 1.0 wt % to about 5.0 wt %, or about 0.1 wt % to about 1.0 wt %, based on the total weight of the emulsion.

The person of ordinary skill in the art will appreciate that a variety of other components can be present in the emulsions of the disclosure.

In certain embodiments of the disclosure, the emulsions of the disclosure may have a heat capacity in the range of about 1 J/gK to about 50 J/gK. For example, in certain embodiments of the emulsion as otherwise described herein, the heat capacity in the range of about 1 J/gK to about 30 J/gK, or about 1 J/gK to about 20 J/gK, or about 1 J/gK to about 15 J/gK, or about 1 J/gK to about 10 J/gK, or about 3 J/gK to about 30 J/gK, or about 3 J/gK to about 20 J/gK, or about 3 J/gK to about 15 J/gK, or about 3 J/gK to about 10 J/gK, or about 2 J/gK to about 5 J/gK, or about 3 J/gK to about 4 J/gK.

In certain embodiments of the disclosure, the emulsions of the disclosure may have a thermal conductivity in the range of about 0.05 W/mK to about 1 W/mK. For example, in certain embodiments of the emulsion as otherwise described herein, the thermal conductivity in the range of about 0.25 W/mK to about 1 W/mK, or about 0.5 W/mK to about 1 W/mK about 0.75 W/mK to about 1 W/mK, or about 0.05 W/mK to about 0.5 W/mK.

In certain embodiments of the disclosure, the emulsions of the disclosure may have a kinematic viscosity at 30° C. of about 1 to about 10 cSt, e.g., about 1 to about 9 cSt, or about 1 to about 8 cSt, or about 1 to about 7 cSt, or about 1 to about 6 cSt, or about 5 to about 10 cSt, or about 5 to about 9 cSt, or about 5 to about 8 cSt, or about 5 to about 7 cSt as measured in accordance with ASTM D455.

As described above, the emulsions of the disclosure can be provided in a variety of concentrations. In certain embodiments, an emulsion of the disclosure is provided at a concentration that is itself suitable for use as a thermal management fluid/such a emulsion can be used undiluted in thermal management applications. So another aspect of the disclosure is a thermal management fluid in the form of an emulsion of the disclosure.

And in other embodiments, a emulsion of the disclosure is provided at a concentration suitable for use as a thermal management fluid concentrate, i.e., at a concentration that can be diluted with other media (e.g., water, or a combination of water and one or more of glycerol, methanol, ethylene glycol, propylene glycol, and diethylene glycol) to provide a thermal management fluid. Salts such as potassium formate, for example, may be used to depress the freezing point of the emulsion.

Accordingly, an emulsion of the disclosure may also be provided by diluting a more concentrated emulsion (e.g., a more concentrated emulsion of the disclosure).

In one exemplary embodiment, an emulsion of the disclosure includes: in the range of about 10 to about 60 wt % of the phase change material; in the range of about 5 to about 10 wt % emulsifier; in the range of about 0 to about 50 wt % glycerol; in the range of about 0 to about 5 wt % other additives; and the remaining balance of water. In certain such embodiments, glycerol may be replaced with either ethylene glycol or propylene glycol. In certain such embodiments, the emulsion may further include other freezing point depressants, such as salts, in the range of about 0 to about 25 wt %. In certain such embodiments, various additives used in traditional water-based coolants may also be included in the emulsion. Such an emulsion can be, for example, used as a concentrate for a thermal management fluid.

Thus, another aspect of the disclosure is a thermal management comprising an emulsion of the disclosure, e.g., prepared by combining an emulsion of the disclosure with an aqueous fluid. An emulsion of the disclosure may be diluted, for example, with a desired quantity of water. In certain embodiments, the emulsion is used in an amount of about 1 wt % to about 50 wt % based on the total weight of the thermal management fluid; e.g., about 5 wt % to about 30 wt %, or about 5 wt % to about 20 wt %, or about 20 wt % to about 30 wt %. In certain embodiments, the dilution may be carried out more than once; for example, the process may effectively form a series of thermal management fluids with each subsequent fluid having a lower concentration of the emulsion of the disclosure. One of skill in the art may dilute the thermal management fluid until the desired thermal management performance is achieved.

A suitable method of preparing the emulsions of the disclosure is described in U.S. Patent Application Publication No. 2013/0201785, which is hereby incorporated herein by reference in its entirety. This publication discloses an apparatus for mixing phase change materials and aqueous materials under a shear force and laminar flow to create either an oil-in-water or a water-in-oil fluid. Thus, one aspect of the disclosure provides a method of preparing the emulsion of the disclosure, the method comprising obtaining a first fluid comprising one or more emulsifiers dissolved in an aqueous carrier fluid (e.g., water); obtaining a second fluid comprising the phase change material; contacting the first fluid with the second fluids under a shear force to produce an intermediate fluid. This intermediate fluid may be in the form of a colloidal emulsion, and may be free-flowing or gel-like. The intermediate fluid may also have a greater viscosity than either the first fluid or the second fluid, e.g., at least 5% higher, or at least 10% higher, or at least 50% higher. This intermediate fluid may comprise micelles of the phase change material in the aqueous carrier fluid. Both the first fluid and the second fluid may be added to a chamber in which stirrers are used to mix the two fluids together under shear force by rotating at a rotational speed of about 1200 to about 1600 rpm. The shape of the chamber and size of the stirrers may be chosen to ensure that a region around the walls of the chamber is devoid of turbulent flow. Thus, whilst a phase change material is under shear, an aqueous suspension of a emulsifier can flow around the chamber in this region thereby producing a laminar flow. In certain embodiments, a third fluid may be added to the intermediate fluid under laminar flow (for example, increasing the water content of the aqueous carrier fluid to decrease the viscosity of the resulting emulsion).

The methods of the disclosure allow for materials with high viscosities to be emulsified into a stable emulsion. It is currently difficult to emulsify fluids having a viscosity of greater than approximately 100 to 150 cSt at 40° C. using the current techniques. The method of the disclosure can be used to emulsify fluids having a viscosity of 8,000 to 12,000 cSt and solid phase materials at 40° C. The actual limit is dependent upon the temperature of the various components during emulsification. For example, it may be necessary to heat components up to around 90° C. to achieve emulsification.

In certain other aspects, the disclosure provides a method of preparing an emulsion of the disclosure, the method comprising: obtaining a first fluid comprising one or more emulsifiers; obtaining a second fluid comprising a phase change material; contacting the first fluid with the second fluids under a shear force to produce an intermediate fluid; and contacting the intermediate fluid with an aqueous carrier fluid (e.g., water) under laminar flow to obtain the emulsion. The intermediate fluid may have a greater viscosity than either the first fluid or the second fluid, e.g., at least 5% higher, or at least 10% higher, or at least 50% higher. Both the first fluid and the second fluid may be added to a chamber in which stirrers are used to mix the two fluids together under shear force by rotating at a rotational speed of about 1200 to about 1600 rpm.

Another aspect of the disclosure provides a method comprising passing a thermal management fluid according to any of the embodiments described above over a surface, and absorbing thermal energy in the thermal management fluid from the surface. An embodiment of such a method is illustrated with reference to FIG. 1. A thermal management circuit 100 is shown in a schematic cross-sectional side view in FIG. 1. The thermal management circuit 100 includes a thermal management fluid 120 that is circulated through the circuit and passes over surface 142. The temperature of surface 142 is elevated in comparison to the temperature of thermal management fluid 120. As a result, thermal energy is absorbed in thermal management fluid 120 from surface 142.

In certain embodiments as otherwise described herein, the method includes producing the thermal energy by operating an electrical component. For example, thermal management circuit 100 is associated with electrical component 140, which produces heat during operation. In certain embodiments the heat is produced as elements of the electrical component charge and discharge. As will be understood by those of ordinary skill in the art, inefficiencies in the operation of the electrical component and resistances in the circuits corresponding circuits create heat as current passes through the circuits and elements of the electrical component. For example, the heat from the operation of electrical component 140 causes surface 142 to rise in temperature, which then results in the transfer of thermal energy to thermal management fluid 120. In other embodiments, the thermal energy is produced by a chemical reaction, such as an exothermic reaction, or by friction. In still other embodiments, the thermal management fluid is chilled and absorbs thermal energy from surfaces at ambient or slightly elevated temperatures.

In certain embodiments as otherwise described herein, the electrical component includes a battery pack, a capacitor, a fuel cell, a motor, or a computer. For example, in certain embodiments the electrical component is a battery pack that includes one or more electrochemical cells disposed in a housing. In other embodiments the electrical component is one or more capacitors, such as an electrolytic capacitor or an electric double-layer capacitor, e.g., a supercapacitor. In still other embodiments, the electrical component is one or more fuel cells, such as a polymer electrolyte membrane fuel cell, a direct methanol fuel cell, an alkaline fuel cell, a phosphoric acid fuel cell, a molten carbonate fuel cell, a solid oxide fuel cell, or a reversible fuel cell. In certain embodiments the electrical component is an electric motor. Still in other embodiments, the electrical component is a computer, for example a personal computer or a server.

In certain embodiments as otherwise described herein, the surface is a surface of the electrical component. For example, in FIG. 1 a housing of 150 of electrical component 140 contains a reservoir of thermal management fluid 120. Elements of the electrical component including certain circuits that produce heat is submerged in thermal management fluid 120 and the thermal management fluid absorbs thermal energy directly from an outside surface 142 of the electrical component 140.

Figure 2:
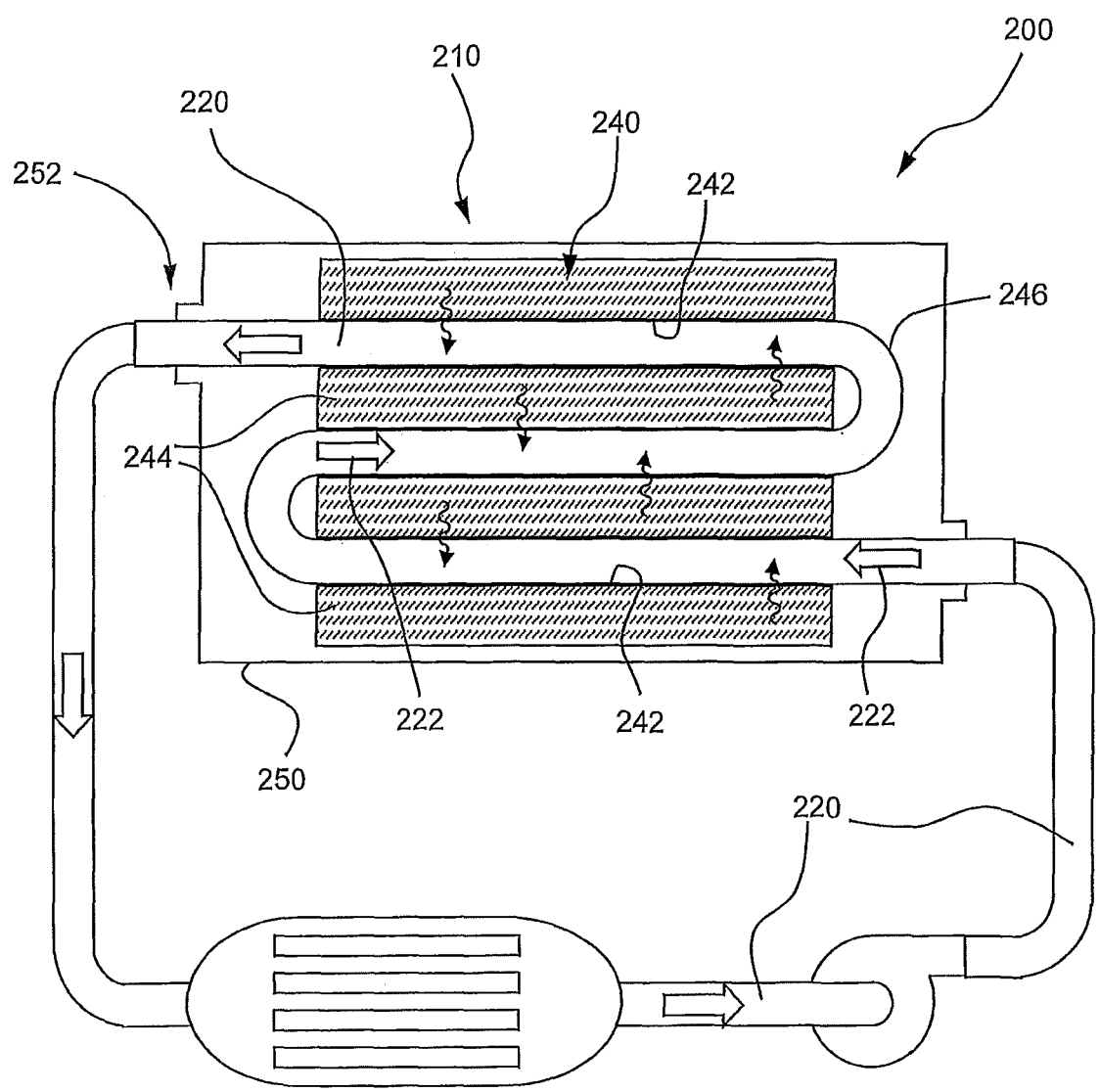
FIG. 2 is a schematic cross-sectional view of a thermal management circuit according to another embodiment of the disclosure.

In certain embodiments as otherwise described herein, the surface is an internal surface of a conduit. For example, FIG. 2 shows a thermal management circuit 200 that includes electrical component 240 that includes a plurality of individual units 244. In particular, the electrical component 240 is a battery that includes a plurality of electrochemical cells 244. Electrical component 240 further includes a conduit 246 that extends through the inside of the electrical component and between the electrochemical cells 244. As the electrical component produces thermal energy, the internal surface 242 of the conduit 246 is heated and the thermal energy is absorbed by the thermal management fluid 220.

In certain embodiments as otherwise described herein, the conduit passes through a housing that surrounds the electrical component. For example, conduit 246 in thermal management circuit 200 extends through apertures 252 in the housing 250 surrounding electrical component 240, which allow thermal management fluid 220 to be conveyed to other elements of the thermal management circuit 200.

Another aspect of the disclosure provides a battery pack comprising: a housing; one or more electrochemical cells disposed in the housing; a fluid path extending through the housing and in substantial thermal communication with the one or more electrochemical cells; and a thermal management fluid according to any of the embodiments described above that is disposed in the fluid path. For example, thermal management circuit 200 in FIG. 2 includes battery pack 210. The battery pack includes a plurality of electrochemical cells 244 that are disposed inside housing 250. A conduit 246 forms a fluid path that extends through the housing. Thermal management fluid 220 disposed in conduit 246 is thereby placed in thermal communication with the electrochemical cells 244. As the electrochemical cells 244 charge and discharge they produce heat which is absorbed by the thermal management fluid 220. In certain embodiments the electrochemical cells are subject to fast charging which yields a large amount of heat. The high heat capacity of the thermal management fluid is able to absorb this large amount of heat quickly as it is produced.

In certain embodiments as otherwise described herein, the fluid path is at least partially defined by a cavity of the housing. For example, in certain embodiments at least a portion of the fluid path is formed between the electrochemical cells and the inside wall of the housing, similar to fluid path 122 in component 140.

In certain embodiments as otherwise described herein, the fluid path is at least partially defined by at least one conduit disposed in the housing. For example, in battery pack 210, conduit 246 provides the fluid path 222 through the housing 250.

In certain embodiments as otherwise described herein, the electrochemical cells are lithium ion electrochemical cells. In other embodiments, the electrochemical cells are aluminum ion cells, lead-acid cells, or magnesium ion cells.

In certain embodiments as otherwise described herein, the battery pack is a component of an electric vehicle. In some embodiments, the electric vehicle is a fully electric vehicle or a hybrid electric vehicle. In other embodiments the battery pack is part of a stationary energy storage solution, for example a home energy storage solution that operates in cooperation with local renewable energy sources, such as solar panels or wind turbines.

Another aspect of the disclosure provides a thermal management circuit comprising a fluid path extending around and/or through an electrical component, a heat exchanger, a pump, at least one duct connecting the fluid path, the heat exchanger, and the pump, and a thermal management fluid according to any of embodiments described above, wherein the thermal management fluid is disposed in the fluid path, the heat exchanger, the pump and the connecting duct. For example, thermal management circuit 100 shown in FIG. 1 includes a fluid path 122 that runs around electrical component 140. Thermal management fluid 120 flows through path 122 absorbing thermal energy from electronic component 140. From fluid path 122, the thermal management fluid 120 flows through a first duct 130 to heat exchanger 160. Thermal energy that has accumulated in thermal management fluid 120 is removed from the fluid within heat exchanger 160 before the fluid flows through a second duct 132 to pump 170. After pump 170, the thermal management fluid 120 passes through a third duct 134 returning it to fluid path 122 surrounding electrical component 140. Circuit 100, shown in FIG. 1, is a schematic depiction of an uncomplicated embodiment employing the described thermal management fluid. In other embodiments, the thermal management circuit includes additional elements, such as any combination of valves, pumps, heat exchangers, reservoirs and ducts.

In certain embodiments as otherwise described herein, the fluid path is defined by a housing around the electrical component. For example, housing 150 in FIG. 1 surrounds electrical component 140 and provides a cavity for thermal management fluid 120. Electrical component 140 is held in the housing at a distance from the walls of housing 150, which allows a path for thermal management fluid 120 to form between the housing 150 and the electrical component 140. While housing 150 has an enclosed shape with specific apertures 152 providing access for thermal management fluid 120, in other embodiments the top of the housing is open and the thermal management fluid is retained in the housing by gravity.

In certain embodiments as otherwise described herein, the fluid path is configured to position the thermal management fluid in substantial thermal communication with the electrical component so as to absorb thermal energy produced by the electrical component. For example, in thermal management circuit 100 fluid path 122 extends around electrical component 140 and is in direct contact with the surfaces of electrical component 140. Further, in thermal management circuit 200 fluid path 222 passes through a conduit 246 that runs adjacent to the elements of electrical component 240. In both cases, the fluid path places thermal management fluid in close proximity to the electrical component so that the thermal management fluid readily absorbs thermal energy from the component.

In certain embodiments as otherwise described herein, the heat exchanger is configured to remove heat from the thermal management fluid. For example, in thermal management circuit 100, after thermal management fluid 120 is pumped out of housing 150 it passes to heat exchanger 160 where the thermal energy is transferred to a cooler fluid, such as ambient air or a cooling liquid.

In certain embodiments as otherwise described herein, the thermal management circuit includes a battery pack according to any of the embodiments described above. For example, thermal management circuit 200 includes battery pack 210.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

Certain aspects of the disclosure are now explained further via the following non-limiting examples.

EXAMPLES

Example 1

The emulsion of the disclosure was prepared by using the above-noted methods. Specifically, 53.9 wt % paraffin wax (SASOLWAX, available from Sasol), with a melting point of 64° C., 6.9 wt % emulsifier (Wax Emulsifier 2106 available from Clariant), and 6.9 wt % glycerol were combined in 32.3 wt % water and emulsified. After emulsification, the resultant micelles were analyzed using a Beckman Coulter Laser Diffraction PS Analyzer (LS 13 320) The mean particle size of the micelles in the emulsion was determined to be 0.510 μm, the median particle size was 0.505 μm and the mode particle size was 0.520 μm, with fewer than 10% of particles having a mean diameter of less than 0.415 μm or greater than 0.617 μm.

Figure 3:
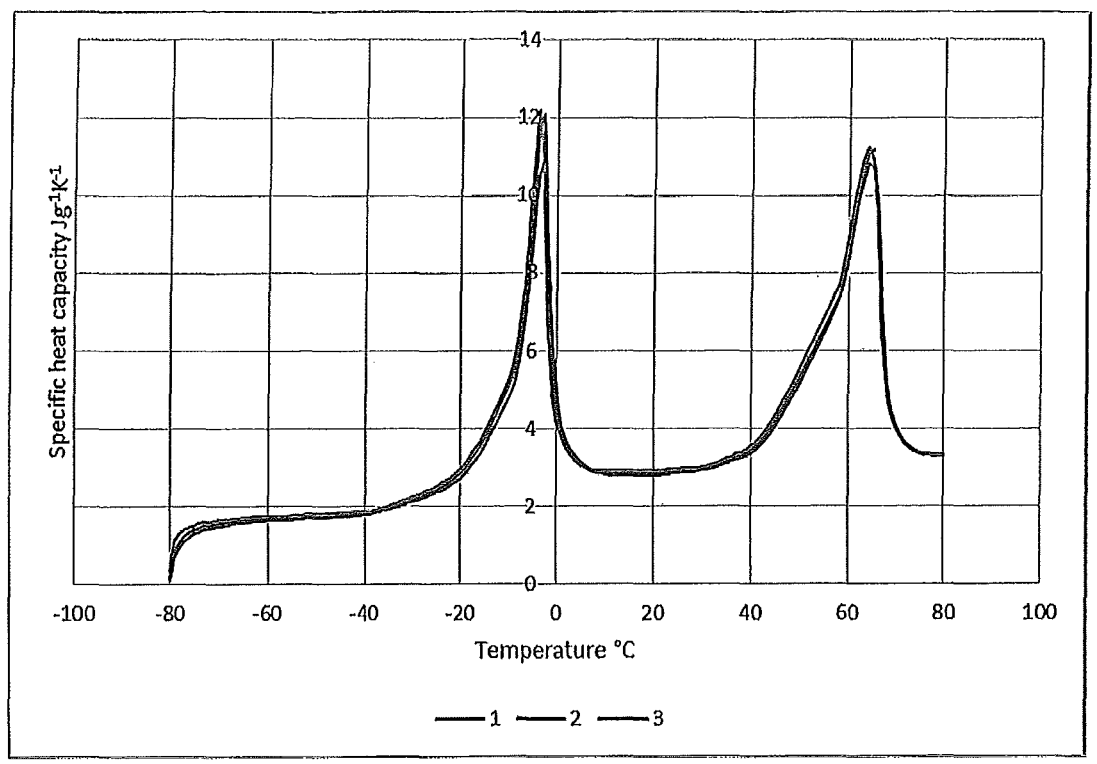
FIG. 3 is a graph illustrating the variation of the specific heat capacity of the emulsion of Example 1 at temperatures of −80° C. to +80° C. The data is an overlay of three different measurements taken for the same material.

FIG. 3 shows the variation of the specific heat capacity of the obtained emulsion from −80° C. to +80° C.; the data of FIG. 3 is also presented in Table 1 below. A spike in heat capacity around 12 J/gK is due to ice from the continuous water phase melting at −8.4° C. (note that the melting point of the solution is lower than 0° C. due to the presence of glycerol). For reference, the specific heat capacities of fluids containing water only or 50:50 water/glycol are 4.18 J/gK or 3.41 J/gK, respectively. Therefore, the emulsion of Example 1 dramatically increased the heat capacity of the coolant fluid. The second spike in heat capacity is at the melting point of the wax.

TABLE 1

| Run | Onset (° C.) | Area (J/g) | Onset (° C.) | Area (J/g) |
|---|---|---|---|---|
| 1 | −8.22 | 79.7 | 51.86 | 103.4 |
| 2 | −8.61 | 73.44 | | |
| 3 | −8.41 | 79.02 | 51.86 | 107.1 |
| Average | −8.4 | 77.4 | 51.9 | 105.3 |
| SD | 0.2 | 3.4 | 0.0 | 2.6 |

The inventors have determined that different paraffins may be selected based on their melting points. For example, the paraffins having melting point most relevant to the end application, such as battery charging, can used. It is also possible to provide an emulsion comprising a variety of phase change materials, each with a different melting point and/or mass, such that the solid phase change materials enter the liquid phase over a range of temperatures. This results in the emulsion being able to provide a constant or varying cooling effect as desired.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

Various embodiments of the disclosure include, but are not limited to:

Embodiment 1. An emulsion comprising:
an aqueous carrier fluid; and
a dispersion of micelles within the aqueous carrier fluid, wherein each micelle comprises a solid hydrophobic core particle comprising a phase change material and one or more emulsifiers forming a micellar shell around the solid hydrophobic core particle, wherein the micelles have a mean particle size diameter in the range of about 0.1 μm to about 1.5 μm.

Embodiment 2. The emulsion of embodiment 1, wherein the micellar size distribution d10 is no less than 50% of d50 and d90 is no more than 150% of d50, or d10 is no less than 60% of d50 and d90 is no more than 140% of d50, or d10 is no less than 70% of d50 and d90 is no more than 130% of d50, or d10 is no less than 75% of d50 and d90 is no more than 125% of d50, or d10 is no less than 80% of d50 and d90 is no more than 120% of d50.

Embodiment 3. The emulsion of embodiment 2, wherein d50 is in the range of 0.1 μm to 1.5 μm; e.g., 0.1 μm to 1.2 μm, or 0.1 μm to 1.0 μm, or 0.1 μm to 0.5 μm, or 0.1 μm to 0.4 μm, or 0.2 μm to 1 μm, or 0.2 μm to 0.8 μm, or 0.2 μm to 0.6 μm, or 0.2 μm to 0.5 μm, or 0.2 μm to 0.4 μm, or 0.4 μm to 1 μm, or 0.4 μm to 0.8 μm, or 0.4 μm to 0.6 μm, or 0.4 μm to 0.5 μm, or 0.3 μm to 0.5 μm, or 0.35 μm to 0.45 μm.

Embodiment 4. The emulsion of embodiment 1 or 2, wherein the micelles have a mean diameter in the range 0.1 μm to 1 μm; e.g., about 0.1 μm to about 0.8 μm, or about 0.1 μm to about 0.6 μm, or about 0.1 μm to about 0.5 μm, or about 0.1 μm to about 0.4 μm, or about 0.2 μm to about 1 μm, or about 0.2 μm to about 0.8 μm, or about 0.2 μm to about 0.6 μm, or about 0.2 μm to about 0.5 μm, or about 0.2 μm to about 0.4 μm, or about 0.4 μm to about 1 μm, or about 0.4 μm to about 0.8 μm, or about 0.4 μm to about 0.6 μm, or about 0.4 μm to about 0.5 μm, or about 0.3 μm to about 0.5 μm, or about 0.35 μm to about 0.45 μm.

Embodiment 5. The emulsion of any of embodiments 1-4, wherein the one or more emulsifiers is substantially bound into the micelles, e.g., wherein less than 5 wt % of the one or more emulsifiers is present in the aqueous solution in an unbound state, or less than 2 wt %, or less than 1 wt %, or less than 0.1 wt %, or less than 0.01 wt %, or even less than 0.001 wt % based on the total weight of the emulsion.

Embodiment 6. The emulsion of any of embodiments 1-5, wherein the phase change material is a waxy material.

Embodiment 7. The emulsion of any of embodiments 1-5, wherein the phase change material is paraffin.

Embodiment 8. The emulsion of any of embodiments 1-5, wherein the phase change material is 1-cyclohexylooctadecane, 4-heptadacanone, quinone, benzamide, or a mixture thereof.

Embodiment 9. The emulsion of any of embodiments 1-8, wherein the phase change material has a melting point of at least 30° C.; e.g., at least 50° C., or at least 70° C., or in the range of 30° C. to 100° C.

Embodiment 10. The emulsion of any of embodiments 1-9, wherein the micelles comprise one phase change material.

Embodiment 11. The emulsion of any of embodiments 1-9, wherein the micelles comprise a first set of micelles having solid hydrophobic core particles comprising a first phase change material, and a second set of micelles having solid hydrophobic core particles comprising a second phase change material different from the first phase change material.

Embodiment 12. The emulsion of embodiment 11, wherein the first phase change material and the second phase change material have substantially the same melting point (e.g., no more than 5° C. difference in melting points, or no more than 2° C. difference in melting points, or no more than 1° C. difference in melting points).

Embodiment 13. The emulsion of embodiment 11, wherein the first phase change material and the second phase change material have different melting points (e.g., at least 10° C. difference in melting points, or at least 20° C. difference in melting points, or at least 50° C. difference in melting points).

Embodiment 14. The emulsion of any of embodiments 1-13, wherein the phase change material is present in the composition in an amount of about 1 wt % to about 70 wt % based on the total weight of the emulsion, e.g., in an amount of about 1 wt % to about 50 wt %, or about 1 wt % to about 30 wt %, or about 1 wt % to about 15 wt %, or about 1 wt % to about 10 wt %, or about 1 wt % to about 5 wt %, or about 2 wt % to about 70 wt %, or about 2 wt % to about 50 wt %, or about 2 wt % to about 30 wt %, or about 2 wt % to about 15 wt %, or about 2 wt % to about 10 wt %, or about 5 wt % to about 70 wt %, or about 5 wt % to about 50 wt %, or about 5 wt % to about 30 wt %, or about 5 wt % to about 15 wt %, or about 10 wt % to about 70 wt %, or about 10 wt % to about 50 wt %, or about 10 wt % to about 30 wt %, or about 20 wt % to about 70 wt %, or about 20 wt % to about 50 wt %, or about 40 wt % to about 70 wt % based on the total weight of the emulsion.

Embodiment 15. The emulsion of any of embodiments 1-14, wherein the one or more emulsifiers is selected from the group consisting from molecules having the structure hydrocarbyl group-aryl group-polyether group.

Embodiment 16. The emulsion of any of embodiments 1-15, wherein the one or more emulsifiers is present in an amount of about 1 wt % to about 10 wt % based on the total weight of the emulsion, e.g., in an amount of about 1 wt % to about 8 wt %, or about 1 wt % to about 6 wt %, or about 1 wt % to about 5 wt %, or about 2 wt % to about 10 wt %, or about 2 wt % to about 8 wt %, or about 2 wt % to about 6 wt %, or about 2 wt % to about 5 wt %, or about 3 wt % to about 10 wt %, or about 3 wt % to about 8 wt %, or about 3 wt % to about 6 wt %, or about 3 wt % to about 5 wt %, or about 5 wt % to about 10 wt %, or about 5 wt % to about 8 wt %, or about 5 wt % to about 6 wt % based on the total weight of the emulsion.

Embodiment 17. The emulsion of any of embodiments 1-16 having a heat capacity in the range of about 10 J/gK to about 35 J/gK.

Embodiment 18. The emulsion of any of embodiments 1-17 having a thermal conductivity in the range of about 0.05 W/mK to about 1 W/mK.

Embodiment 19. The emulsion of any of embodiments 1-18 having a kinematic viscosity of about 3 to about 40 cSt.

Embodiment 20. A method of preparing a emulsion according to any of embodiments 1-19, the method comprising:
 obtaining a first fluid comprising one or more emulsifiers dissolved in an aqueous carrier fluid;
 obtaining a second fluid comprising one or more phase change materials;
 contacting the first fluid with the second fluids under a shear force to produce an intermediate fluid; and
 recovering the emulsion from the intermediate fluid.

Embodiment 21. The method of embodiment 20, wherein contacting the first fluid and the second fluid comprises stirring at a rotational speed in the range of about 1200 to about 1600 rpm.

Embodiment 22. The method of embodiment 21 or 22, further comprising contacting the intermediate fluid with a third fluid under a lamellar flow prior to recovering the emulsion.

Embodiment 23. A thermal management fluid prepared by combining the emulsion of any of embodiments 1-19 with an aqueous fluid, or comprising the emulsion of any of embodiments 1 to 19.

Embodiment 24. The thermal management fluid of embodiment 23, wherein the emulsion is used in an amount of about 1 wt % to about 50 wt % based on the total weight of the thermal management fluid; e.g., about 5 wt % to about 40 wt %, or about 5 wt % to about 20 wt %, or about 20 wt % to about 50%.

Embodiment 25. A method comprising:
 passing an emulsion of embodiments 1-19 or a thermal management fluid of embodiment 23 or 24 over a surface; and
 absorbing thermal energy in the thermal management fluid from the surface.

Embodiment 26. The method according to embodiment 25, further comprising producing the thermal energy by operating an electrical component.

Embodiment 27. The method according to embodiment 25 or embodiment 26, wherein the electrical component includes a battery pack, a capacitor, a fuel cell, a motor, an inverter, electrical cables or a computer.

Embodiment 28. The method according to embodiment 26 or embodiment 27, wherein the surface is a surface of the electrical component.

Embodiment 29. The method according to any of embodiments 25-27, wherein the surface is an internal surface of a conduit.

Embodiment 30. The method according to embodiment 29, wherein the conduit passes through a housing that surrounds the electrical component.

Embodiment 31. A battery pack comprising:
 a housing;
 one or more electrochemical cells disposed in the housing;
 a fluid path extending through the housing and in substantial thermal communication with the one or more electrochemical cells; and
 an emulsion of embodiments 1-19 or a thermal management fluid of embodiment 23 or 24 disposed in the fluid path.

Embodiment 32. The battery pack according to embodiment 31, wherein the fluid path is at least partially defined by a cavity of the housing.

Embodiment 33. The battery pack according to embodiment 31 or embodiment 32, wherein the fluid path is at least partially defined by at least one conduit disposed in the housing.

Embodiment 34. The battery pack according to any of embodiments 31-33, wherein the electrochemical cells are lithium ion electrochemical cells.

Embodiment 35. The battery pack according to any of embodiments 31-34, wherein the battery pack is a component of an electric vehicle.

Embodiment 36. The battery pack according to any of embodiments 31-34, wherein the electric vehicle is a fully electric vehicle or a hybrid electric vehicle.

Embodiment 37. A thermal management circuit comprising:
 a fluid path extending around and/or through an electrical component;
 a heat exchanger;
 a pump;
 at least one duct connecting the fluid path, the heat exchanger, and the pump; and
 an emulsion of embodiments 1-19 or a thermal management fluid of embodiment 23 or 24, wherein the thermal management fluid is disposed in the fluid path, the heat exchanger, the pump and the connecting duct.

Embodiment 38. The thermal management circuit according to embodiment 37, wherein the fluid path is defined by a housing around the electrical component.

Embodiment 39. The thermal management circuit according to embodiment 37 or embodiment 38, wherein the fluid path is configured to absorb thermal energy produced by the electrical component in the thermal management fluid.

Embodiment 40. The thermal management circuit according to any of embodiments 37-39, wherein the heat exchanger is configured to dissipate heat from the thermal management fluid.

Embodiment 41. The thermal management circuit according to any of embodiments 37-40, wherein the electrical component is a battery including a plurality of electrochemical cells, and wherein the fluid path passes between at least two of the electrochemical cells.

We claim:

1. A method for removing thermal energy comprising:
passing a thermal management fluid in the form of an emulsion over a surface, wherein the thermal management fluid comprises
an aqueous carrier fluid; and
a dispersion of micelles within the aqueous carrier fluid, wherein each micelle comprises a solid hydrophobic core particle comprising a phase change material, wherein the phase change material is paraffin, and one or more surfactants forming a micellar shell around the solid hydrophobic core particle, wherein a weight ratio of the amount of phase change material to an amount of surfactants is in a range of 1 to 10; wherein the micelles have a mean particle size diameter in a range of about 0.1 µm to about 1 µm, wherein a micellar size distribution d10 is no less than 80% of d50 and d90 is no more than 120% of d50, and wherein the phase change material has a melting point in a range of 35° C. to 100° C.;
wherein the emulsion has a heat capacity in a range of about 10 J/gK to about 35 J/gK; and
absorbing thermal energy in the thermal management fluid from the surface.

2. The method of claim 1, wherein the surface has an elevated temperature compared to a temperature of the thermal management fluid.

3. The method of claim 1, wherein the surface is a surface of an electrical component.

4. The method of claim 1, wherein the method further comprises producing the thermal energy by a chemical reaction.

5. The method of claim 1, wherein the method further comprises producing the thermal energy by operating an electrical component.

6. The method of claim 5, wherein the electrical component is selected from a battery pack, a capacitor, a fuel cell, a motor, or a computer.

7. The method of claim 5, wherein passing the thermal management fluid over the surface comprises circulating the thermal management fluid through a thermal management circuit associated with the electrical component.

8. The method of claim 5, wherein passing the thermal management fluid over the surface comprises submerging the electric component in the thermal management fluid.

9. The method of claim 1, wherein absorbing the thermal energy comprises chilling the thermal management fluid.

10. The method of claim 1, wherein the method further comprising removing the thermal energy that has accumulated in the thermal management fluid.

11. The method of claim 1, wherein the thermal management fluid has a thermal conductivity in the range of about 0.05 W/mK to about 1 W/mK.

12. The method of claim 1, wherein the emulsion has a kinematic viscosity of about 3 to about 40 cSt.

13. The method of claim 1, wherein less than 5 wt % of the one or more emulsifiers surfactants is present in the aqueous solution in an unbound state, based on a total weight of the emulsion.

14. The method of claim 1, wherein the phase change material is 1-cyclohexylooctadecane, 4-heptadacanone, quinone, benzamide, or a mixture thereof.

15. The method of claim 1, wherein the micelles comprise one phase change material.

16. The method of claim 1, wherein the phase change material is present in the emulsion in an amount of about 1 wt % to about 70 wt % based on a total weight of the emulsion.

17. The method of claim 1, wherein the one or more surfactants is selected from the group consisting from molecules having the structure hydrocarbyl group-aryl group-polyether group.

* * * * *